June 5, 1951     E. L. MASTERS     2,555,855
PLANT SETTER
Filed Feb. 5, 1947
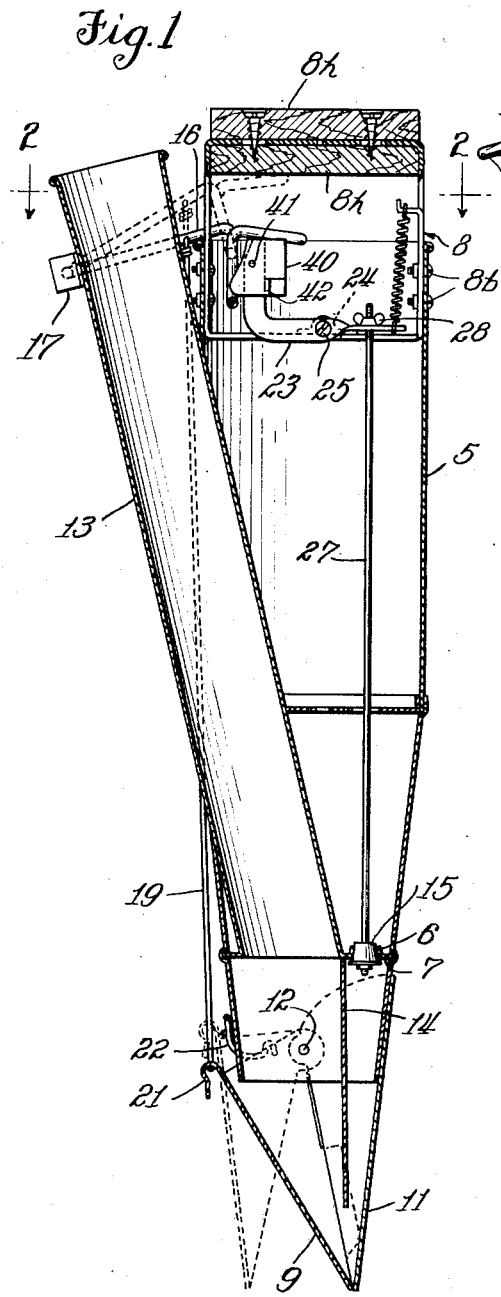
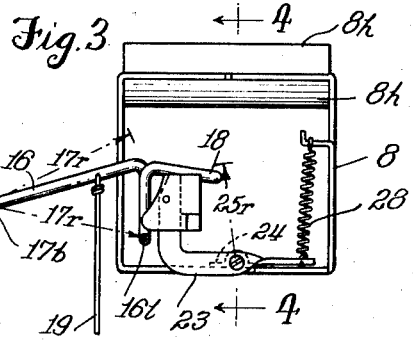
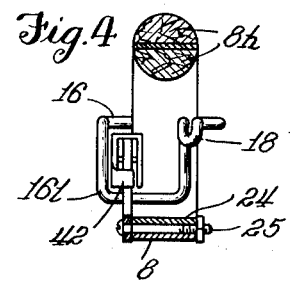
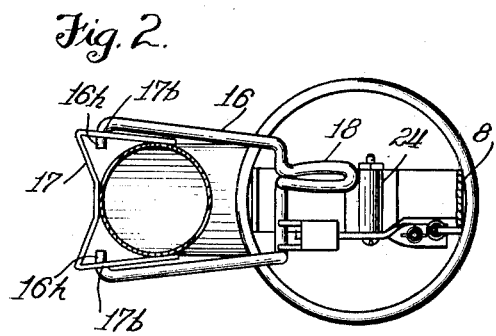
INVENTOR.
Edwin L. Masters
BY
Charles K Worden
Agent Patented June 5, 1951

2,555,855

UNITED STATES PATENT OFFICE 2,555,855

PLANT SETTER

Edwin L. Masters, Benton Harbor, Mich.

Application February 5, 1947, Serial No. 726,531

1 Claim. (Cl. 111—4)

This invention relates to plant setters and particularly to a manually operated device adapted for setting or planting tobacco, cabbage, tomato plants and the like which are usually first grown in hot-beds and later transplanted or set in the field for mature development and field crops. This invention is an improvement over my Patent No. 2,171,067, issued August 29, 1939.

The particular improvement effected by the present invention is to consolidate all of the various mechanism used in a device of this character whereby the various operating mechanism may be assembled in a single sub-assembly and applied to the base or frame of the setter as a single unit wherein the various inter-related operating mechanisms are fixed in the single sub-assembly and are not affected by piecemeal attachment to the base or frame of the plant setter. The embodiment of the present invention is shown for illustrative purposes in the accompanying drawings, in which Fig. 1 is a vertical sectional elevational view of a plant setter embodying the improved features of the present invention;

Fig. 2 is an enlarged plan sectional view taken substantially on the section lines 2—2 of Fig. 1;

Fig. 3 is an elevation view of the complete subassembly of operating mechanisms which may be attached in a unitary manner to the frame of the plant setter and wherein all of the inter-related operating points are fixed to a single handle unit as will later be explained; and Fig. 4 is a transverse sectional elevation view of the unitary assembly as it would appear on the section lines 4—4 of Fig. 3.

The illustrative embodiment of the present invention comprises a fluid containing body member or reservoir 5 having an aperture and valve seat 6 formed in the bottom 7 thereof, and provided with a carrying handle 8 adjacent the upper end of the body member.

Adjacent the lower end portion of the body member 5 are a pair of relatively movable cooperating earth shovels 9 and 11, the shovel 11 being shown, in the present instance, as relatively fixed with respect to the body member, and the member 9 being pivotally mounted at 12 on the body member and adapted normally to occupy a position indicated by full lines in Fig. 1, with its lower end portion closely adjacent the shovel 11 for insertion into the ground and adapted to be swung about its pivotal center as indicated by dotted lines in Fig. 1, in a manner to form a recess in the ground adapted to receive a plant inserted therein through a plant tube 13 mounted on or carried by the body member 5 and operatively related to the shovels 9 and 11, the relatively fixed shovel 11 having a partition member or guide wall 14 associated therewith for directing fluid from the body member or reservoir 5 to a point adjacent the lower end of the shovels when a valve 15 operatively related to the valve seat 6 is opened or removed from the valve seat.

For actuating the movable shovel 9, there is provided a bifurcated lever or arm 16, the bifurcated parts of which are provided with inturned pintle ends 16—l which are adapted to be engaged or snapped in bearing apertures 17—b in the arms of bracket 17, the end portions of which arms are secured to the plant tube 13 in straddling relation; the opposite or free end of the lever 16 extending inwardly and provided with a finger piece 18 positioned adjacent and preferably below the carrying handle 8 in a manner to be engaged by the fingers of one's hand used for supporting and carrying the plant setter, the arm 16 being connected, preferably, intermediate its ends to the upper ends of links 19 which in turn are connected adjacent their lower ends to a hook or loop 21 on a movable shovel 9, the connections and arrangement being such that when the arm 16 is swung upwardly to the dotted line position shown in Fig. 1, the shovel 9 is moved to the dotted line position shown in Fig. 1, the shovels 9 and 11 will be separated, thereby forming a recess in the ground to receive a plant from the tube 13, the movable shovel 9 being returned to its normal or full line position by a spring 22 operatively related to a portion of the body member 5 and the movable shovel.

Now referring to Fig. 1, it will be observed that I have provided a square handle bracket 8 having wooden handles 8—h attached to the upper end thereof to effectively support the open ends of the square frame structure by means of screws as shown. Now referring also to Figs. 2, 3 and 4, it will be observed that the entire operating mechanism of my plant setter is mounted on this square handle frame 8. A valve trip lever 23 is mounted on the lower base of the frame 8 by U-clip 24 and a pivot bolt 25. The outer end of said lever 23 is resiliently urged upwardly by coil spring 28 also attached to the bracket 8. On the opposite end of the pivotal lever 23 is mounted a U-shaped trip member 40 pivotally mounted on the lever 23 by a pin 41 restrained from clockwise rotation by a latch portion 42 which bears against the inner side of the lever 23. It will be appreciated, however, that this pivotal member 40 with a cam surface upon its left hand side is not restrained from counter-clockwise rotation about the pivot 41. The pivotal lever 16 has a lower looped section 16—*l* which extends under the lower outer edge of the trip member 40. This lever 16 is readily mounted by merely springing the arms outwardly whereby the inturned ends or hooks 16—*h* can be inserted in the brackets 17, being firmly held therein by the tension effected by the looped handle 18 as readily shown in Fig. 2. When the operator is carrying the plant setter by the handle 8—*h*, his fingers are readily adjusted under the handle 18 and upon upward movement of the handle 18 the lever 16 pivoting on the points 17—*b* through the arc 17—*r* bears against the lower loop of the latch 40 to raise the lever 23 upwardly against the tension of the spring 28 until the arcuate movement of the levers 16 and 23 as represented by the radius 17—*r* and 25—*r* separate until the loop 16—*l* passes by the latch member 40, whereupon the spring 28 promptly returns the lever 23 to lowered position past the latch member 40 which pivots counter clockwise to allow the loop 16—*l* to pass underneath. Thus, by the single upward movement of the lever 18 the rod 27 releases the valve 15 from sealed contact with the valve seat 6 and a quantity of water is deposited adjacent the plant, dropping through the tube 13 and conducted by the guide wall 14 to effectively water the plant as it is dropped in the opening provided by the movement of the shovel 9. Thus, the entire operating mechanism is effectively controlled by the single movement of the lever 18 and upon return movement the loop 16—*l* readily passes by the pivotal latch 40 to again be positioned under the latch for subsequent operation. By observing Fig. 3, it will be appreciated that the entire operating mechanism is mounted on the handle bracket 8 and this entire mechanism as a sub-assembly may be attached to the tubular member 6 by bolts 8—*b* as shown.

Thus I have provided a means whereby the entire operating mechanism of my plant setter may be mounted on a single bracket member as a sub-assembly and that all operating points of this sub-assembly are fixed in relationship to this mounting bracket 8. Thus inaccuracies between parts are eliminated and the entire structure maintained in integrated working relationship that may not be disturbed by any movement between the parts. This provides not only an easier and better working mechanism, but also a mechanism that is more sturdy and will operate effectively over a longer period of time. The number of parts has been reduced materially and various small parts used in my holder construction have been eliminated in favor of fewer and more sturdy parts.

Having thus described my invention, I now claim as new:

In a manually operable plant setter having a generally vertical water reservoir, a valve in the bottom of said reservoir, a plant tube alongside the reservoir, a movable shovel at the lower end of the tube, a U-shaped member having substantially parallel legs straddling the upper portion of the tube and secured thereto, the legs of said member having bearing apertures therein, and operating linkage extending upwardly from said valve and shovel; the improvement which comprises a unitary operating control sub-assembly comprising a bracket having a handle portion and a support portion, said bracket being adapted to fit into the upper end of the reservoir and be removably secured thereto, a valve lever pivoted on said support portion and having an upwardly extending arm, a trip member pivoted on said arm and having a stop engaging said arm to prevent pivotal movement of said trip member in one direction, a bifurcated lever having yielding arms provided with inturned ends adapted for journaling in said bearing apertures for ready removal, said bifurcated lever having within said bracket a finger piece and an integral downwardly extending loop, said trip member having a portion normally extending into said loop, elevation of said bifurcated lever by said finger piece serving to engage under the trip member to pivot the valve lever until the loop becomes disengaged from the trip member and descent of the bifurcated lever pivoting the trip member to pass the loop under the trip member, the operating linkage from the valve and shovel being adapted to be operatively connected with the valve lever and bifurcated lever, respectively.

EDWIN L. MASTERS.

REFERENCES CITED

The following references are of record in the file of this patent:

UNITED STATES PATENTS

| Number | Name | Date |
|---|---|---|
| 1,098,221 | Boyles | May 26, 1914 |
| 2,171,067 | Masters | Aug. 29, 1939 |